(12) United States Patent  
Greenwood

(10) Patent No.: US 7,749,088 B2  
(45) Date of Patent: Jul. 6, 2010

(54) HORSE SIMULATOR

(75) Inventor: William Ronald Greenwood, Cheshire (GB)

(73) Assignee: Racewood Limited, Chesire (GB)

( * ) Notice: Subject to any disclaimer, the term of this patent is extended or adjusted under 35 U.S.C. 154(b) by 39 days.

(21) Appl. No.: 12/073,900

(22) Filed: Mar. 11, 2008

(65) Prior Publication Data

US 2008/0227068 A1 Sep. 18, 2008

Related U.S. Application Data

(63) Continuation of application No. 11/294,334, filed on Dec. 6, 2005, now abandoned.

(30) Foreign Application Priority Data

Dec. 6, 2004 (GB) ................................. 0426734.0

(51) Int. Cl.  
*A63G 13/06* (2006.01)  
*A63G 19/20* (2006.01)

(52) U.S. Cl. .......................... 472/97; 472/135; 434/247
(58) Field of Classification Search ........... 472/95–100; 434/56, 247; 482/48, 51, 52  
See application file for complete search history.

(56) References Cited

U.S. PATENT DOCUMENTS 4,957,444 A 9/1990 Armen

| 4,988,300 | A | 1/1991 | Yamaguchi et al. |
| 5,931,739 | A | 8/1999 | Layer et al. |
| 6,264,569 | B1 | 7/2001 | Cannavino |
| 6,808,458 | B1 | 10/2004 | Jung |
| 2006/0147887 | A1 | 7/2006 | Greenwood |

FOREIGN PATENT DOCUMENTS

| DE | 1991 22 81 | 10/2000 |
| EP | 0 407 158 A1 | 1/1991 |
| EP | 0 612 542 A1 | 2/1994 |
| GB | 2 317 350 A | 3/1998 |
| WO | WO 01/89649 A1 | 11/2001 |

OTHER PUBLICATIONS

Search Report issued in GB No. 0426734.0 on Jun. 2, 2005.

*Primary Examiner*—Kien T Nguyen  
(74) *Attorney, Agent, or Firm*—Smith, Gambrell & Russell, LLP

(57) ABSTRACT

The present invention relates to a simulator for simulating the movement of a horse comprising: a base; a body portion for receipt of a rider and having a longitudinal axis corresponding to the simulated forward and backward movement of a horse; a first linkage extending between said body portion and said base; a second linkage extending between said body portion; and a mechanism capable of providing vertical and horizontal movement to the longitudinal axis of the body portion. The present invention also relates to a kit of parts for producing the simulator. The simulator is particularly useful as a training aid for people to ride horses, in addition to improving stamina and general fitness.

31 Claims, 3 Drawing Sheets

HORSE SIMULATOR

CROSS REFERENCE TO RELATED APPLICATION

This application is a continuation of Ser. No. 11/294,334, filed Dec. 6, 2005 now abandoned which is being incorporated in its entirety herein by reference.

The present invention relates to horse simulators and in particular, but not exclusively, to simulators which confer a realistic motion of a horse that a rider may experience.

Horse simulators can be used for a number of applications, such as sports training for equestrian sports, assisting people with co-ordination difficulties and novelty fun rides, to name a few. Whilst there are a number of horse simulators currently available, their motion is often unlike that of a true horse and they are therefore not a true representation on which how a rider should position himself or herself.

The horse simulators that are currently available rely upon hydraulics to actuate the various movements of the horse body. The hydraulics can be controlled by a central processing unit (CPU) which actuates a pre-programmed movement of the horse and such movement is controlled by an operator. A number of problems are associated with such simulators, for example the hydraulic rams have a limited life span, resulting in a potential leakage of fluid. These simulators therefore require an extensive servicing regime. DE199112281 discloses a riding simulator relying upon a pneumatic system which removes the risk of fluid leakage, although the pneumatic rams also have a limited life span. In addition, both simulators tend to have a disjointed motion which is unlike a real horse due to the number of rams involved.

A number of other 'hobby horse' type simulators have also been disclosed (such as in U.S. Pat. No. 4,957,444 and U.S. Pat. No. 6,264,569), although they do not provide enough variation in movement to simulate the difference between walking, trotting or cantering. WO 01/89649 discloses a more complicated racing horse simulator, but again it is not able to simulate the different motions of the horse and only simulates the motion of a horse galloping.

It is therefore an object of the present invention to alleviate one or more of the problems associated with the prior art simulators. It is also an object of the present invention to provide a horse simulator that simulates a realistic motion of a horse for an individual. Furthermore, it is another object of the present invention to provide a simulator that is capable of simulating a number of different movements of a horse, such as a walk, a trot and a canter and for the smooth sequential transition from one movement to another.

In accordance with an embodiment of the present invention, there is provided a simulator for simulating the movement of a horse comprising:

(a) a base;

(b) a body portion for receipt of a rider and having a longitudinal axis corresponding to the simulated forward and backward movement of a horse;

(c) a first linkage extending between said body portion and said base;

(d) a mechanism capable of providing vertical and horizontal movement to the body portion with respect to said base; and (e) a second linkage extending between said body portion and said mechanism.

The present invention therefore provides for a simple mechanism which may be employed to provide a simulator that has a number of effective and realistic movement. Such a simulator will be applicable in a number of applications, such as a training individuals to ride a horse and for experienced riders to further develop their riding skills and/or stamina. The simulator may also be used to assist those recovering from injury and/or muscular diseases, but may equally be used as a novelty simulator.

The said first and second linkage may comprise elongate members and such members may be arms produced from a suitably rigid material such as metal. Preferably, the mechanism is driven by a motor which is electric, although the mechanism could also be driven manually or powered by a number of sources. Should an electric motor be used, it is preferred that the motor is of a size in the region of 1.5 kW and is powered by mains electricity. The mechanism may also employ electromagnetic actuators or hydraulic/pneumatic rams if required.

The said motor may drive a first pulley connected to a first crank which in turn is pivotally connected to the second linkage so as to effect a vertical movement of said body portion. Furthermore, the motor may further drive a second pulley connected to a second crank which in turn is pivotally connected to a middle portion of the second linkage so as to effect a horizontal movement of said body portion. The mechanism therefore provides for the movement required by the body portion so as to simulate the movement of a horse.

A gearing means may be located between said motor and said first and/or second pulley and it will be apparent to one skilled in the art that such a gearing will allow the rotation of the pulley (and therefore cranks) to be controlled, in addition to the use of a motor of a reduced size. The first pulley and/or the second pulley may be driven from the engine by means of toothed belt, although a smooth drive belt, chain or direct drive may also be employed. The second pulley may be connected to a clutch and/or a brake for selectively preventing or allow the rotation of the crank. The engagement of the clutch or brake may be actuated automatically when different movements of the body portion are required. When the crank attached to the second pulley is static, the body portion can only move in a vertical manner, simulating a walk or a trot. Whereas when the crank is rotating, the body portion can move in a vertical and horizontal manner in order to mimic a canter and/or a gallop. Additionally, the crank may have a sensor attached thereto to sense the rotation and/or rotation speed of the crank in addition to the position of the crank. The sensing means can be used to assess when and when not to allow rotation of the crank attached to the second pully, so as to allow for a smooth transition between movements.

A covering may be placed over the body portion, which may be in the shape of a horse. The covering may be constructed out of a number of materials, such as fibreglass and other composite materials. Preferably, the covering also has a portion (corresponding to the back of a horse), which may be used for an individual to be seated and may also comprise or allow for a saddle to be placed thereon. The simulator may also allow for the covering and/or the covering to lean either to the left or the right so that an individual can also use the simulator to practice riding when cornering etc. Alternatively, the whole simulator may be able to lean.

The action of the mechanism may be controlled by a central processing unit (CPU). The CPU may have any number of input and/or output sensors, such as a sensor located near to a crank and/or pulley to assess the rotation speed. The information from the sensors can then be relayed to the central processing unit. The CPU may control the engagement of the clutch and/or the brake of the crank attached to the second pulley so as to allow the differential movement between a trot and a canter. Alternatively, a pre-determined rotation speed of the second pulley may determine whether a clutch (such as a centrifugal clutch) is engaged to rotate the crank. The speed of the cranks can therefore be controlled and the movement of the simulator controlled accordingly. The position of the cranks may be synchronised relative to one another prior to engagement or disengagement of the clutch and/or brake. Preferably, the cranks will synchronise at a 3 o'clock position prior to engagement or disengagement. It is also preferred that when the clutch is disengaged, that a brake is applied so as to steady the second linkage. The action of the mechanism may be controlled by a control panel and such a control panel may be located on the simulator or located remotely from the simulator.

The action of the mechanism may also be controlled by controlling sensors located within the body covering and such sensors may correspond to locations in a horse that are used to control a real horse. For example, the sensors may be located in portions of the covering corresponding to the stirrup and rein area of a horse and a canter may be induced by an individual digging their heel into the stirrup area of the covering. Therefore, a kick sensor in the stirrup area of the covering may be used by an individual to increase the speed of the mechanism, whilst a pull sensor in the reins may be used by an individual to decrease the speed of the mechanism (or indeed to stop it). The kick sensor may also be able to determine whether the individual wishes to go faster, such as a constant pressure applied by the heels, or whether to change from a walk to a trot, such as by means of a kick.

So as to prevent the simulator from causing injury or an inexperienced rider not being able to control the simulator, an override switch may also be provided which stops the mechanism. Such a switch may also be provided so as to automatically sense if an individual is no longer seated. The simulator may also be turned on or off by means of a key, so that unauthorised use of the simulator is prevented.

The simulator can therefore simulate a walk, a trot, a canter, a gallop and a halt by varying the speed of the crack attached to the first pulley and whether or not the crank attached to the second pulley is rotating. Furthermore, the simulator can also operate at intermediate speeds so as to simulate a slow trot, a rising trot, a slow canter and a fast canter, for example.

The present invention also provides for a kit of parts for producing a simulator for simulating the vertical and horizontal movements of a horse, the kit comprising:

(a) a base;
(b) a body portion adapted for receiving an individual;
(c) two or more linkage arms; and
(d) a mechanism for providing movement to said linkage arms.

The kit of parts may also comprise a motor for attachment to at least one linkage arm. The kit may also be used to produce a simulator as hereinabove described.

By way of example only, a specific embodiment of the present invention will now be described with reference to the accompanying drawings in which.

Figure 1:
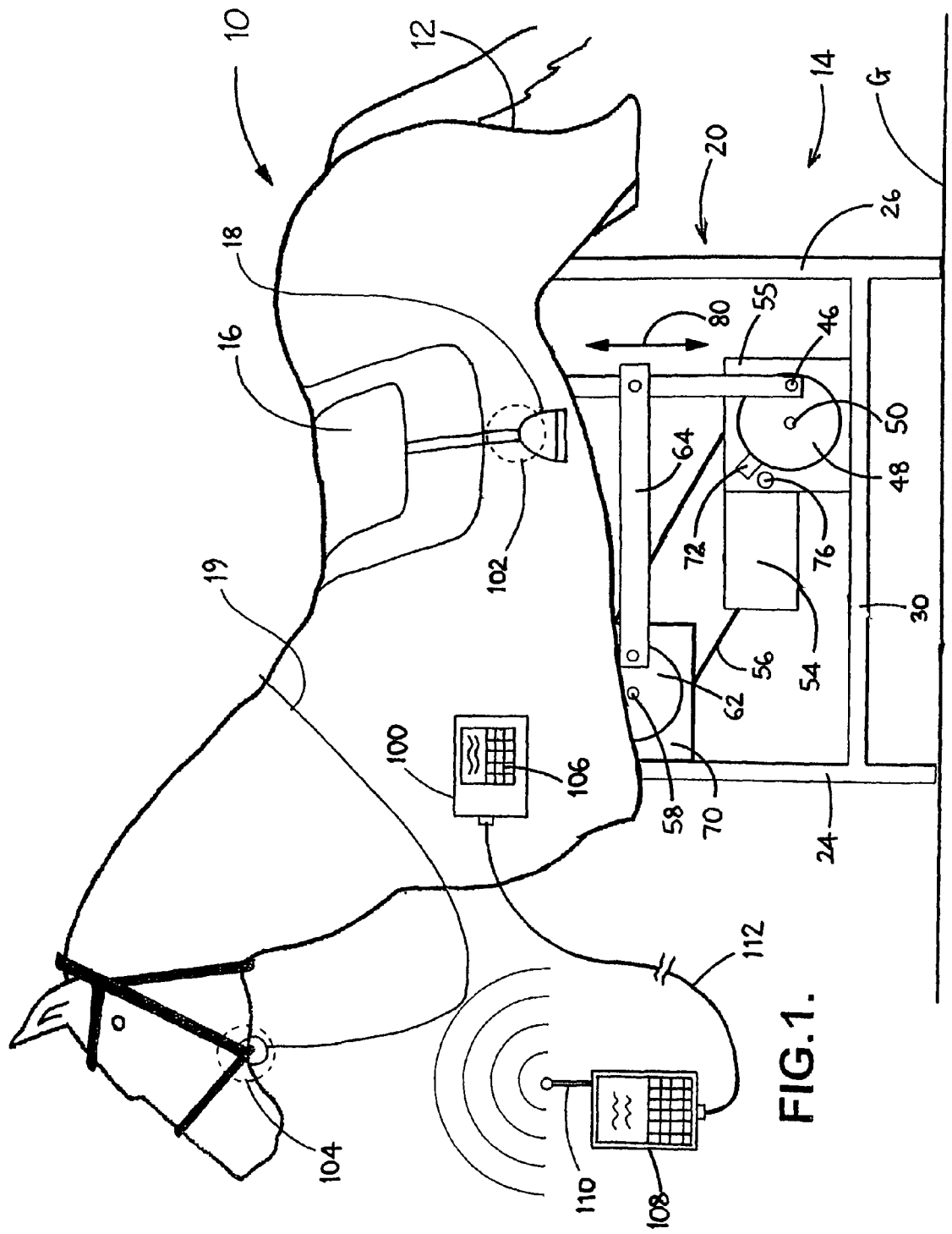
FIG. 1 is a side view of an embodiment of horse simulator in accordance with the present invention.

With reference to the Figures, a horse simulator 10 comprises a moulded glass fibre or plastics shell 12, having the shape of the exterior of the upper portion of a horse, which is supported on a frame 14 which rests on the ground G (or other surface). FIG. 1 also shows a saddle 16, stirrups 18 and reins 19 attached to the horse-shaped shell 12. As will be explained, the horse-shaped shell is movable with respect to the support frame 14, which allows a rider seated on the saddle to experience realistic simulated horse movements.

Figure 2:
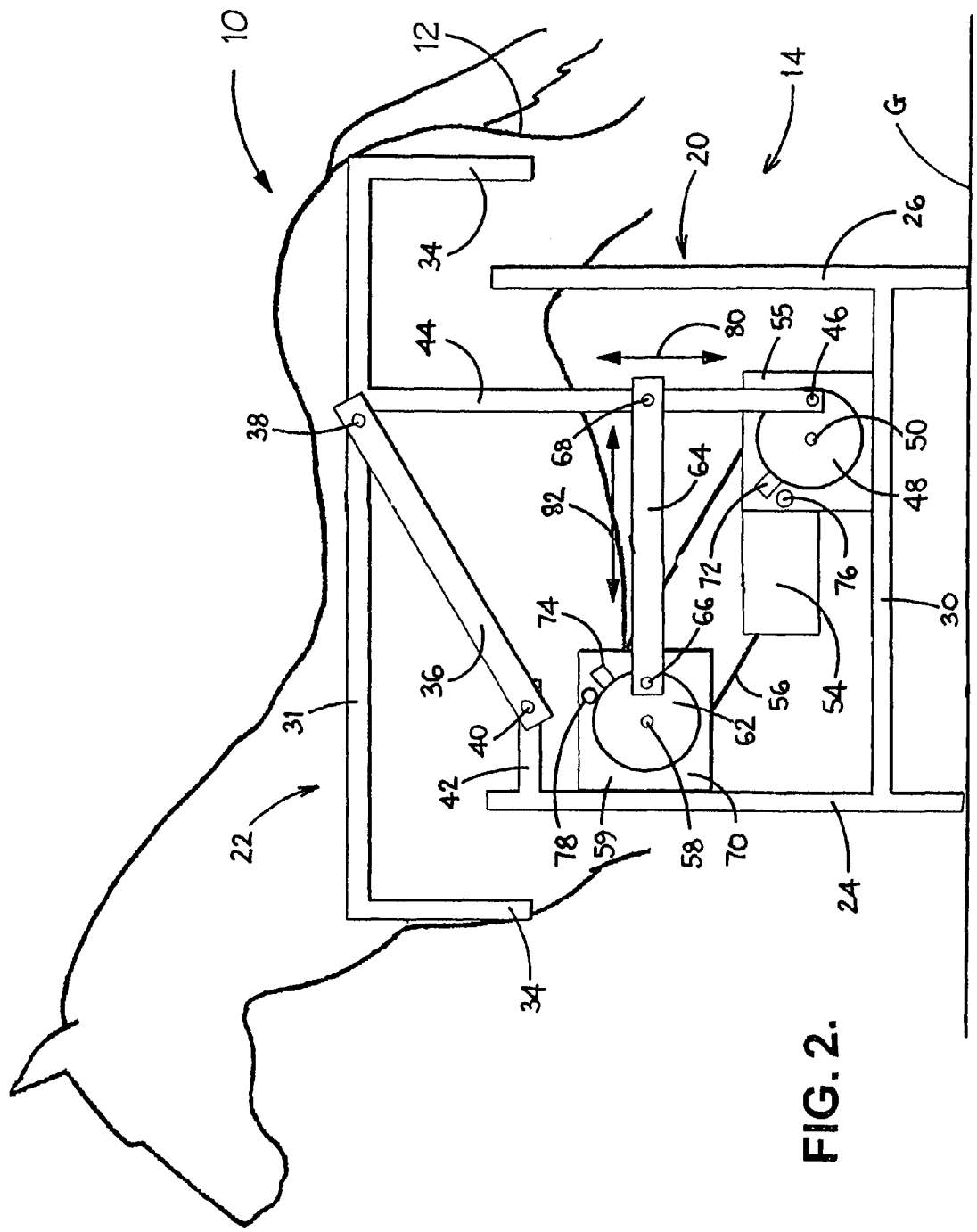
FIG. 2 is a cut-away side view of the horse simulator of FIG. 1.
Figure 3:
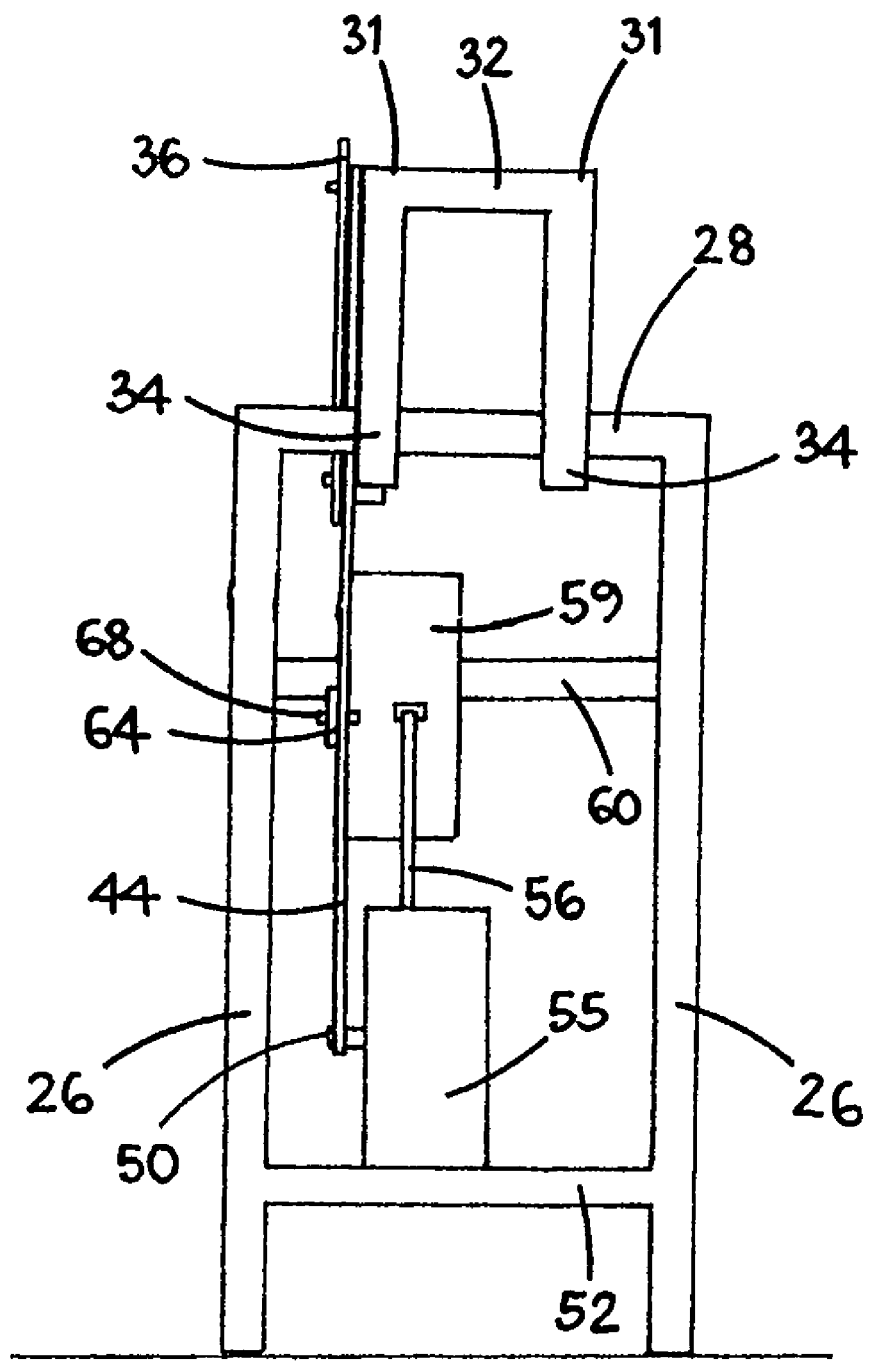
FIG. 3 is a cut-away rear view of the horse simulator of FIG. 1.

As best seen in FIGS. 2 and 3, the supporting frame comprises a fixed frame portion 20 which rests on the ground and a movable frame portion 22 which is connected to the horse-shaped shell 12 and which is movably connected to the fixed frame portion 20.

The fixed frame portion 20 comprises two vertical, parallel front frame members 24 and two vertical, parallel rear frame members 26. The upper ends of the front frame members 24 and the upper ends of the rear frame members 26 are interconnected by a cross-beam 28 and two parallel longitudinally extending side frame members 30 extend between the front and rear frame members 24, 26 parallel to, and just above, the ground G.

The movable frame portion comprises two parallel, elongate, longitudinally extending frame members 31 which are interconnected at their front and rear ends by cross-members 32. Downwardly extending frame members 34 extend from the ends of the longitudinal frame members.

The fixed frame portion 20 and the movable frame portion 22 are connected together in several ways.

Firstly, a first connecting bar 36 is pivotally connected at pivot 38 to one of the longitudinally extending frame members 31 of the movable frame portion 22, about two-thirds along its length from front to rear, and is also pivotally connected at a pivot 40 to a mounting lug 42 projecting rearwardly from one of the front upstanding frame members 24 of the fixed frame portion.

A second connecting bar 44 extends downwardly from one of the longitudinally extending frame members 31 of the movable frame portion 22. The upper end is fixedly secured to the frame member 31 and extends perpendicularly from it at a point just to the rear of the pivotal mounting 38 of the first connecting bar. The opposite end of the second connecting bar is pivotally connected at crank pin 46 to a first crank 48 which rotates with a first pulley 50 mounted on a further cross-member 52 extending between the two longitudinal side members 30 of the fixed base frame portion. The first pulley 50 is rotatable by means of an electric motor 54 mounted on the pulley housing 55.

The rotation of the first pulley 50 is transferred by means of a drive belt 56 to a second pulley 58 which is mounted on a further cross-member 60 extending between the front upright frame members 24 of the fixed frame portion. The output of the second pulley 58 in housing 59 is connected to a second crank 62. A third connecting bar 64 is rotatably mounted at one end to the crank by means of a pivot 66 and is pivotally mounted at the other end to the second connecting bar 44 about one-third of the way from its lower end by means of a pivot pin 68. The second pulley 58 has an associated combined brake/clutch 70 within the housing 59 of the second pulley, which either allows the second crank 62 to rotate or be stationary. A flag or marker 72, 74 is also provided on each crank 48, 62 which allows a reactive sensor 76, 78 (e.g. a magnetic proximity sensor) to determine the position and speed of the cranks in addition to whether or not they are moving.

In use, an individual would mount the horse simulator 10 and sit on the saddle 16 of the horse shaped shell 12 which is made from a fibre glass or similar durable material. The shell 12 also provides a realistic representation of a horse in size, dimensions and feel so as to provide the most realistic simulation as possible to the rider.

The simulator is controlled by controls which are either located upon the shell 12 (such as areas corresponding to the stirrup and reign) or at a position remote from the simulator such that an individual who is not seated on the simulator may operate it. The simulator can be made to simulate a range of different movements that a horse may make when being ridden, such as walking, trotting or cantering.

In order to actuate the simulator into simulating the horse which is walking, the motor 54 is switched on, which in turn rotates the first pulley 50 and the crank 48, resulting in reciprocating movement of the second connecting bar 44 up and down in a generally vertical direction, as indicated by arrows 80. If the simulator is to simulate a trot, the electric motor 54 is separated at a higher speed, which causes the first crank 48 to rotate at an increased velocity. During the time that the simulator is simulating a walk or a trot, the second crank 62 is held stationary by operation of the combined brake/clutch 70.

For the simulator to simulate a canter, the initial rotation of the first crank 48 is maintained. However, the drive belt 56 is allowed to rotate the second crank 62 by operation of the combined brake/clutch 70. Rotation of the second clutch 62 results in reciprocating movement of the third connecting bar in a generally horizontal manner, as shown by arrows 82. The deployment of both cranks 48, 62 also allows the simulator to simulate a gallop by further increasing the speed of the motor 54. The sensors 76, 78 allow the speed/position of the cranks 48, 62 to be assessed and relayed to a central processing unit 100 in order to determine the correct speed required for both cranks so as to produce the correct motion.

The speed/position flags or markers 72, 74 allow the second crank 62 to be engaged and disengaged (by means of the brake/clutch 70) at a predetermined point relative to the first crank 48. For example, the second crank 62 may only be allowed to engage or disengage when the first crank 48 is at the 3 o'clock position. Thus, the transition between the vertical movement and the incorporation of a horizontal movement can be brought about in a smooth and controlled manner. The brake/clutch 70 controls the engagement/disengagement of the second crank 62 and can be electrically controlled. Whilst only a clutch may be used to disengage and engage the second crank 62, the addition of a brake when the clutch has been disengaged further stabilises the crank and ensures that the body portion moves in only the desired manner.

Whilst the simulator may be controlled by either controls 106 located on the horse shaped shell 12 and connected to the central processing unit 100, it may also be controlled by means of a remote device 108, that can either be connected to the central processing device 100 by means of an antenna 110, or a cable 112. Sensors may also be deployed at various points in the shell 12 so as to replicate those signals an individual would use in practice upon a horse in order to invoke a canter for example after a walk. The shell 12 therefore contains a stirrup sensor 102 and a rein sensor 104 for receiving inputs from the rider. The simulator can automatically change from a trot to a canter just by kicking of the leg in the stirrup area of the shell. As with a real horse, the simulator will go faster with applied pressure from the heels. The first kick will make the simulator simulate a walk, a second kick will result in simulation of a trot and a further kick will result in simulation of a cantering action. The simulator also steadies or stops with a pull on the reins, as with a real horse. There can also be an override switch/button which an individual may deploy if he or she is unable to control the simulator by using the controls alone. A key can be used to activate the simulator and to prevent unauthorised use, if desired.

The simulator can be used in a number of applications, such as used for training purposes for the general riding of horses, polo training and horse racing etc. The simulator could equally be used in order to help those with co-ordination difficulties or as therapy for muscular and skeletal complaints, but could also be used as a novelty simulator. By attaching a calorie counter and other associated fitness measuring devices (such as heart beat monitor), the simulator could also be used as a fitness machine.

The invention claimed is:

1. A simulator for simulating the movement of a horse comprising:
   (a) a base;
   (b) a body portion for receipt of a rider and having a longitudinal axis corresponding to the simulated forward and backward movement of a horse;
   (c) a first linkage extending between said body portion and said base;
   (d) a motor driven mechanism capable of providing vertical and horizontal movement to the body portion with respect to said base; and
   (e) a second linkage extending between said body portion and said mechanism;
   wherein said motor drives a first pulley connected to a first crank which in turn is pivotally connected to the second linkage so as to effect a vertical movement of said body portion; and
   wherein the motor further drives a second pulley connected to a second crank which in turn is pivotally connected to a middle portion of the second linkage so as to effect a generally horizontal movement of said body portion.

2. A simulator as claimed in claim 1, wherein said first and second linkages comprise elongate members.

3. A simulator as claimed in claim 1, comprising gearing means located between said motor and said first pulley and/or second pulley.

4. A simulator as claimed in claim 3, wherein said second pulley is connected to a clutch and/or a brake for selectively preventing or allowing the rotation of the second crank.

5. A simulator as claimed in claim 4, comprising one or more sensors for sensing the rotational speed and/or position of one or both of said first and second cranks.

6. A simulator as claimed in claim 1, wherein said body portion is in the shape of a horse.

7. A simulator as claimed in claim 1, wherein said mechanism is controlled by a central processing unit.

8. A simulator as claimed in claim 7, further comprising one or more sensors that sense the rotational speed and/or position of one or both of said cranks, and wherein the information from the sensors is relayed to the central processing unit.

9. A simulator as claimed in claim 8, wherein a pre-determined rotation speed of the second pulley determines whether a clutch is engaged to rotate the second crank.

10. A simulator as claimed in claim 9, wherein the one or more sensors is used to synchronise the cranks prior to engagement or disengagement of the clutch.

11. A simulator as claimed in claim 1, wherein the action of said mechanism is controlled by a control panel.

12. A simulator as claimed in claim 11, wherein the control panel is located on the simulator.

13. A simulator as claimed in claim 11, wherein the control panel is located remotely from the simulator.

14. A simulator as claimed in claim 1, wherein the action of said mechanism is controlled by controlling sensors located within said body portion.

15. A simulator as claimed in claim 14, wherein said controlling sensors located within said body portion correspond to locations on a horse used to control a real horse.

16. A simulator as claimed in claim 15, comprising controlling sensors located in portions of said body portion corresponding to the stirrup and rein area of a horse.

17. A simulator as claimed in claim 1, wherein said body portion has a seating portion for receipt of a rider and/or a saddle to be placed thereon.

18. A simulator as claimed in claim 1, wherein said simulator further comprises an override switch which stops said mechanism.

19. A simulator as claimed in claim 1, wherein the simulator is operated with a key.

20. A simulator as claimed in claim 1, wherein the simulator can simulate a walk, a trot, a canter, a gallop and a halt and intermediate speeds thereof.

21. A simulator as claimed in claim 20, wherein an individual controls the speed of and the type of walk, trot, canter, gallop and halt and intermediate speeds thereof.

22. The use of a simulator as claimed in claim 1 for training individuals for horse riding.

23. A simulator as claimed in claim 1, further comprising a third linkage that has a first portion rotatably mounted to said second crank and a second portion pivotally mounted to the second linkage.

24. A simulator as claimed in claim 1, further comprising a clutch which provides for engagement and disengagement of driving activity in said second crank.

25. A simulator as claimed in claim 24, further comprising first and second sensors respectively associated with said first and second cranks, and a central processing unit which receives input from said sensors and provides for timing activation of the clutch based on the relative positions of said first and second cranks as to smoothen movement direction changes in said simulator.

26. A simulator as claimed in claim 1, wherein said first linkage slopes downward and in a forward, longitudinal direction from an upper pivot connection point with said body portion to a lower pivot connection point with said base, and the upper pivot connection point of said first linkage is longitudinally forward of a pivot connection point of said second linkage with said body portion.

27. A kit of parts for producing a simulator for simulating the vertical and horizontal movements of a horse, the kit comprising:

(a) a base;
(b) a body portion adapted for receiving an individual;
(c) a first linkage arm that is configured for extending between said body portion and said base, and a second linkage arm; and
(d) a motor driven mechanism for providing movement to said first and second linkage arms, which motor driven mechanism includes a motor, a first pulley, a first crank, a second pulley and a second crank, and said motor driven mechanism being configured as to have said motor drive said first pulley, which first pulley is configured for driving connection to said first crank and which first crank is, in turn, configured for being drivingly connected to said second linkage arm so as to effect a vertical movement of said body portion when the kit is in use, and wherein said motor driven mechanism is further configured as to drive said second pulley, which second pulley is configured for driving connection to said second crank, and which second crank is, in turn, configured for a driving connection with a middle portion of the second linkage so as to effect a generally horizontal movement of said body portion when the kit is in use.

28. A kit of parts as claimed in claim 27, wherein the kit further comprises one or more sensors for use in sensing the position of one or more of said linkage arms, said pulleys and said cranks.

29. A kit of parts as claimed in claim in claim 27, wherein said body portion is in the shape of a horse.

30. A kit of parts as claimed in claim 27, wherein said mechanism is controlled by a central processing unit.

31. A kit of parts as claimed in claim 27, further comprising a third linkage arm that is configured for being rotatably mounted to said second crank at one portion and pivotally mounted to the second linkage arm at another portion, and a clutch which is configured for engagement and disengagement of driving activity in said second crank, and first and second sensors respectively associated with said first and second cranks, and a central processing unit which is configured for receiving input from said sensors and for timing activation of the clutch based on the relative positions of said first and second cranks.

* * * * *